United States Patent [19]
Story et al.

[11] Patent Number: 5,845,151
[45] Date of Patent: *Dec. 1, 1998

[54] SYSTEM USING DESCRIPTOR AND HAVING HARDWARE STATE MACHINE COUPLED TO DMA FOR IMPLEMENTING PERIPHERAL DEVICE BUS MASTERING VIA USB CONTROLLER OR IRDA CONTROLLER

[75] Inventors: Franklyn H. Story, Chandler; David R. Evoy, Tempe; Peter Chambers, Scottsdale; Lonnie Goff, Tempe, all of Ariz.

[73] Assignee: VLSI Technology, Inc., San Jose, Calif.

[*] Notice: The term of this patent shall not extend beyond the expiration date of Pat. No. 5,777,744.

[21] Appl. No.: 627,992

[22] Filed: Apr. 8, 1996

[51] Int. Cl.⁶ .................................................. G06F 13/00
[52] U.S. Cl. ........................ 395/847; 395/842; 395/848; 395/308
[58] Field of Search ..................................... 395/842, 441, 395/288, 299, 309, 847, 856, 308, 281, 848

[56] References Cited

U.S. PATENT DOCUMENTS

| | | | |
|---|---|---|---|
| 5,265,211 | 11/1993 | Amini et al. | 395/856 |
| 5,287,457 | 2/1994 | Arimilli et al. | 395/308 |
| 5,325,535 | 6/1994 | Santeler et al. | 395/288 |
| 5,450,551 | 9/1995 | Amini et al. | 395/299 |
| 5,454,081 | 9/1995 | Thome | 395/281 |
| 5,469,548 | 11/1995 | Callison et al. | 395/441 |
| 5,542,053 | 7/1996 | Bland et al. | 395/309 |
| 5,590,377 | 12/1996 | Smith | 395/842 |
| 5,613,162 | 3/1997 | Kabenjian | 395/842 |
| 5,619,728 | 4/1997 | Jones et al. | 395/847 |
| 5,621,902 | 4/1997 | Cases et al. | 395/309 |

*Primary Examiner*—Frank J. Asta
*Assistant Examiner*—Le Hien Luu
*Attorney, Agent, or Firm*—Jeffrey D. Moy; Allen J. Moss; Harry M. Weiss & Associates, P.C.

[57] ABSTRACT

The present invention is a desktop personal computer (PC) system having peripheral device bus mastering. The system has a Direct Memory Access (DMA) controller for transferring data to and from the memory of the desktop PC system. A hardware state machine is used for programming the DMA controller, generating and sending command signals, and receiving completion status after the transfer of data is complete. A bus controller is used for implementing a memory data transfer request from the DMA controller means and said hardware state machine means. A device controller, either a Universal Serial Bus (USB) controller or an Infrared Data Association (IrDA) controller, is used for receiving and responding to the command signals from the hardware state machine means, transferring data to and from the DMA controller means, and generating and returning a completion status to the hardware state machine means after the transfer of data is complete.

20 Claims, 2 Drawing Sheets

5,845,151

SYSTEM USING DESCRIPTOR AND HAVING HARDWARE STATE MACHINE COUPLED TO DMA FOR IMPLEMENTING PERIPHERAL DEVICE BUS MASTERING VIA USB CONTROLLER OR IRDA CONTROLLER

RELATED APPLICATIONS

This application is related to the applications entitled "SYSTEM FOR IMPLEMENTING PERIPHERAL DEVICE BUS MASTERING AND METHOD THEREFOR," "A MOBILE COMPUTER SYSTEM HAVING PERIPHERAL DEVICE BUS MASTERING AND METHOD THEREFOR," "SYSTEM AND METHOD FOR IMPLEMENTING PERIPHERAL DEVICE BUS MASTERING IN A MOBILE COMPUTER SYSTEM VIA A UNIVERSAL SERIAL BUS CONTROLLER OR AN INFRARED DATA ASSOCIATION CONTROLLER," and "SYSTEM AND METHOD FOR IMPLEMENTING PERIPHERAL DEVICE BUS MASTERING IN A DESKTOP PERSONAL COMPUTER SYSTEM VIA AN INTEGRATED DRIVE ELECTRONICS HARD DISK CONTROLLER OR AN EXTENDED CAPABILITIES PORT PARALLEL PORT CONTROLLER" filed concurrently herewith, in the name of the same inventors, and assigned to the same assignee as this Application. The disclosures of the above referenced applications are hereby incorporated by reference into this application.

BACKGROUND OF THE INVENTION

1. Field of the Invention

This invention relates generally to computer systems and, more specifically, to a system and method which allows for the implementation of peripheral device bus mastering in desktop personal computer (PC) systems.

2. Background of the Invention

Currently, desktop PC systems provide limited support for peripheral device bus mastering. Bus mastering is the ability of peripheral input/output (I/O) devices to take over transactions on their own behalf. Peripheral device bus mastering is becoming an important strategy in PC systems as the burden on central processing unit (CPU) bandwidth increases. Each reduction in time required by the CPU to control peripheral devices and their data flow results in an increase in available CPU bandwidth that includes operating system overhead for application interfaces and interrupt handling.

Therefore, a need existed to provide a system and method which allows for the implementation of peripheral device bus mastering in a desktop PC system. The system and method must require a minimal amount of additional hardware thereby reducing the cost of implementation of the system into a desktop PC. The system and method must also be able to initiate and complete the processing of unattended transactions and be able to handle multiple transactions without CPU intervention.

SUMMARY OF THE INVENTION

In accordance with one embodiment of the present invention, it is an object of the present invention to provide a desktop personal computer (PC) system having peripheral device bus mastering.

It is another object of the present invention to provide a desktop PC system having peripheral device bus mastering which requires a minimal amount of additional hardware.

It is another object of the present invention to provide a desktop PC system having peripheral device bus mastering which is able to initiate and complete the processing of unattended transactions and is able to handle multiple transactions without CPU intervention.

It is still another object of the present invention to provide a desktop PC system having peripheral device bus mastering which uses a Universal Serial Bus (USB) controller for transferring data.

It is a further object of the present invention to provide a desktop PC system having peripheral device bus mastering which uses an Infrared Data Association (IrDA) controller for transferring data.

BRIEF DESCRIPTION OF THE PREFERRED EMBODIMENTS

In accordance with one embodiment of the present invention, a system for implementing peripheral device bus mastering in a desktop personal computer (PC) system is disclosed. The system is comprised of a desktop PC system. The desktop PC system has Direct Memory Access (DMA) controller means coupled to the desktop PC system for transferring data to and from memory of the desktop PC system. Hardware state machine means are coupled to the DMA controller means for programming the DMA controller means, generating and sending command signals, and receiving completion status after the transfer of data is complete. Descriptor means are stored in the memory of the desktop PC system for describing each data transfer that the hardware state machine means initiates, controls, and completes. Register means within the hardware state machine means are used for storing address information for the descriptor means. Bus controller means are coupled to the DMA controller means and the hardware state machine means for implementing a memory data transfer request from the DMA controller means and the hardware state machine means. Universal Serial Bus (USB) controller means are coupled to the DMA controller means and the hardware state machine means for receiving and responding to the command signals from the hardware state machine means, transferring the data to and from the DMA controller means, and generating and returning the completion status to the hardware state machine means after the transfer of data is complete. The USB controller means are further coupled to peripheral devices wherein the USB controller means interfaces with the peripheral devices over a serial bus.

In accordance with another embodiment of the present invention, a system for implementing peripheral device bus mastering in a desktop PC system is disclosed. The system is comprised of a desktop PC system. The desktop PC system has DMA controller means coupled to the desktop PC system for transferring data to and from memory of the desktop PC system. Hardware state machine means are coupled to the DMA controller means for programming the DMA controller means, generating and sending command signals, and receiving completion status after the transfer of data is complete. Descriptor means are stored in the memory of the desktop PC system for describing each data transfer that the hardware state machine means initiates, controls, and completes. Register means stored within the hardware state machine means are used for storing address information for the descriptor means. Bus controller means are coupled to the DMA controller means and the hardware state machine means for implementing a memory data transfer request from the DMA controller means and the hardware state machine means. Infrared Data Association (IrDA)

controller means are coupled to the DMA controller means and the hardware state machine means for receiving and responding to the command signals from the hardware state machine means, transferring the data to and from the DMA controller means, and generating and returning the completion status to the hardware state machine means after the transfer of data is complete. The IrDA controller means are further coupled to peripheral devices wherein the IrDA controller means is managed by a packet protocol that requires the management of a number of separate data packets of varying sizes.

In accordance with another embodiment of the present invention, a method for implementing peripheral device bus mastering in a desktop PC system is disclosed. The method is comprised of the steps of: providing a desktop PC system; providing DMA controller means coupled to the desktop PC system for transferring data to and from the memory of the desktop PC system; providing hardware state machine means coupled to the DMA controller means for programming the DMA controller means, generating and sending command signals, and receiving completion status after the transfer of data is complete; providing descriptor means stored within the memory of the desktop PC system for describing each data transfer that the hardware state machine initiates, controls, and completes; providing register means stored within the hardware state machine for storing the address information of the descriptor means; providing bus controller means coupled to the DMA controller means and the hardware state machine means for implementing a memory data transfer request from the DMA controller means and the hardware state machine means; and providing USB controller means coupled to the DMA controller means and the hardware state machine means for receiving and responding to the command signals from the hardware state machine means, transferring the data to and from the DMA controller means, and generating and returning the completion status to the hardware state machine means after the transfer of data is complete; the USB controller means further being coupled to peripheral devices wherein the USB controller means interfaces with the peripheral devices over a serial bus.

In accordance with another embodiment of the present invention, a method for implementing peripheral device bus mastering in a desktop PC system is disclosed. The method comprises the steps of: providing a desktop PC system; providing DMA controller means coupled to the desktop PC system for transferring data to and from the memory of the desktop PC system; providing hardware state machine means coupled to the DMA controller means for programming the DMA controller means, generating and sending command signals, and receiving completion status after the transfer of data is complete; providing descriptor means stored in the memory of the desktop PC system for describing each data transfer that the hardware state machine initiates, controls, and completes; providing register means stored within the hardware state machine for storing the address information of the descriptor means; providing bus controller means coupled to the DMA controller means and the hardware state machine means for implementing a memory data transfer request from the DMA controller means and the hardware state machine means; and providing IrDA controller means coupled to the DMA controller means and the hardware state machine means for receiving and responding to the command signals from the hardware state machine means, transferring the data to and from the DMA controller means, and generating and returning the completion status to the hardware state machine means after the transfer of data is complete; the IrDA controller means further being coupled to peripheral devices wherein the IrDA controller means is managed by a packet protocol that requires the management of a number of separate data packets of varying sizes.

The foregoing and other objects, features, and advantages of the invention will be apparent from the following, more particular, description of the preferred embodiments of the invention, as illustrated in the accompanying drawings.

DETAILED DESCRIPTION OF THE PREFERRED EMBODIMENTS

Figure 1:
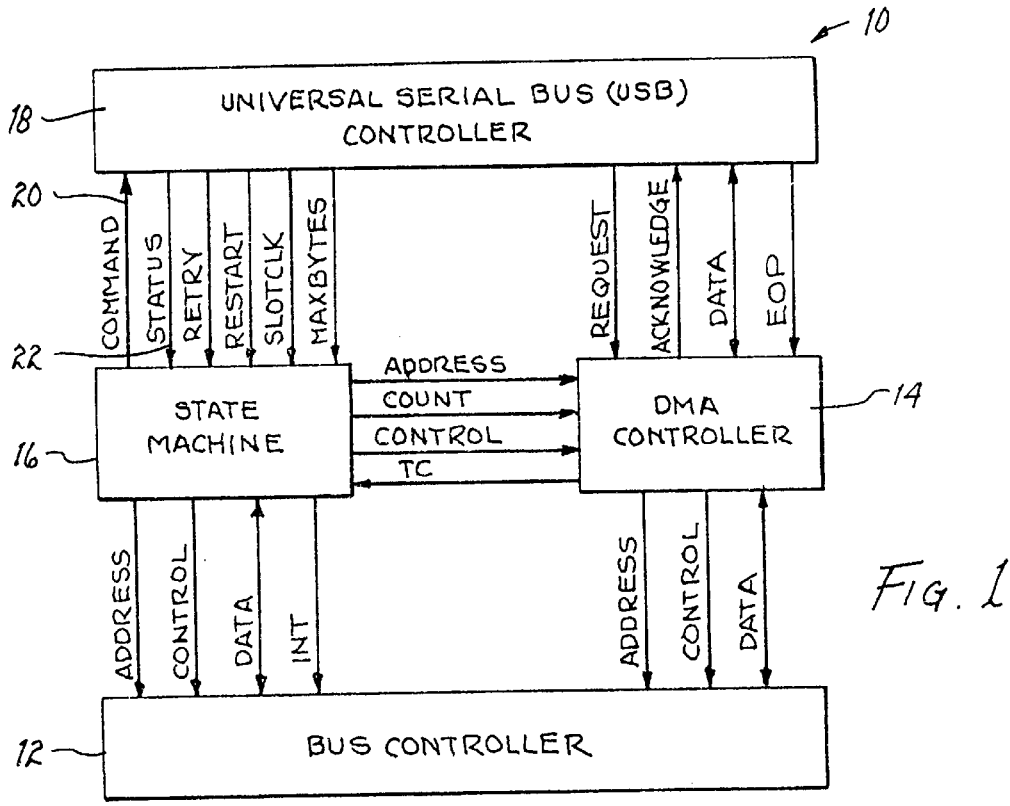
FIG. 1 is a simplified block diagram of a system for implementing peripheral device bus mastering in a desktop PC system via a USB controller.

Referring to FIG. 1, one embodiment of a desktop personal computer (PC) system with peripheral device bus mastering 10 (hereinafter system 10) is shown. The system 10 is comprised of four main components: a bus controller 12, a Direct Memory Access (DMA) controller 14, a hardware state machine 16, and a Universal Serial Bus (USB) controller 18.

The bus controller 12 is coupled to both the DMA controller 14 and to the hardware state machine means 16. The bus controller is used for implementing a memory data transfer request from the DMA controller 14 and from the hardware state machine means 16.

The DMA controller 14 is coupled to the bus controller 12, the hardware state machine 16 and the USB controller 18. The DMA controller is used for transferring data to and from the memory of the system 10. The DMA controller 14 is implemented as a distributed DMA target slice. The advantages of implementing the DMA controller 14 as a distributed DMA target slice are twofold. First, since the distributed DMA target slice is a pre-existing block, it does not require a new design. Thus, the cost associated with implementing the system 10 can be reduced. Second, since the DMA target slice is an industry standard interface, software may be leveraged as well.

Figure 3:
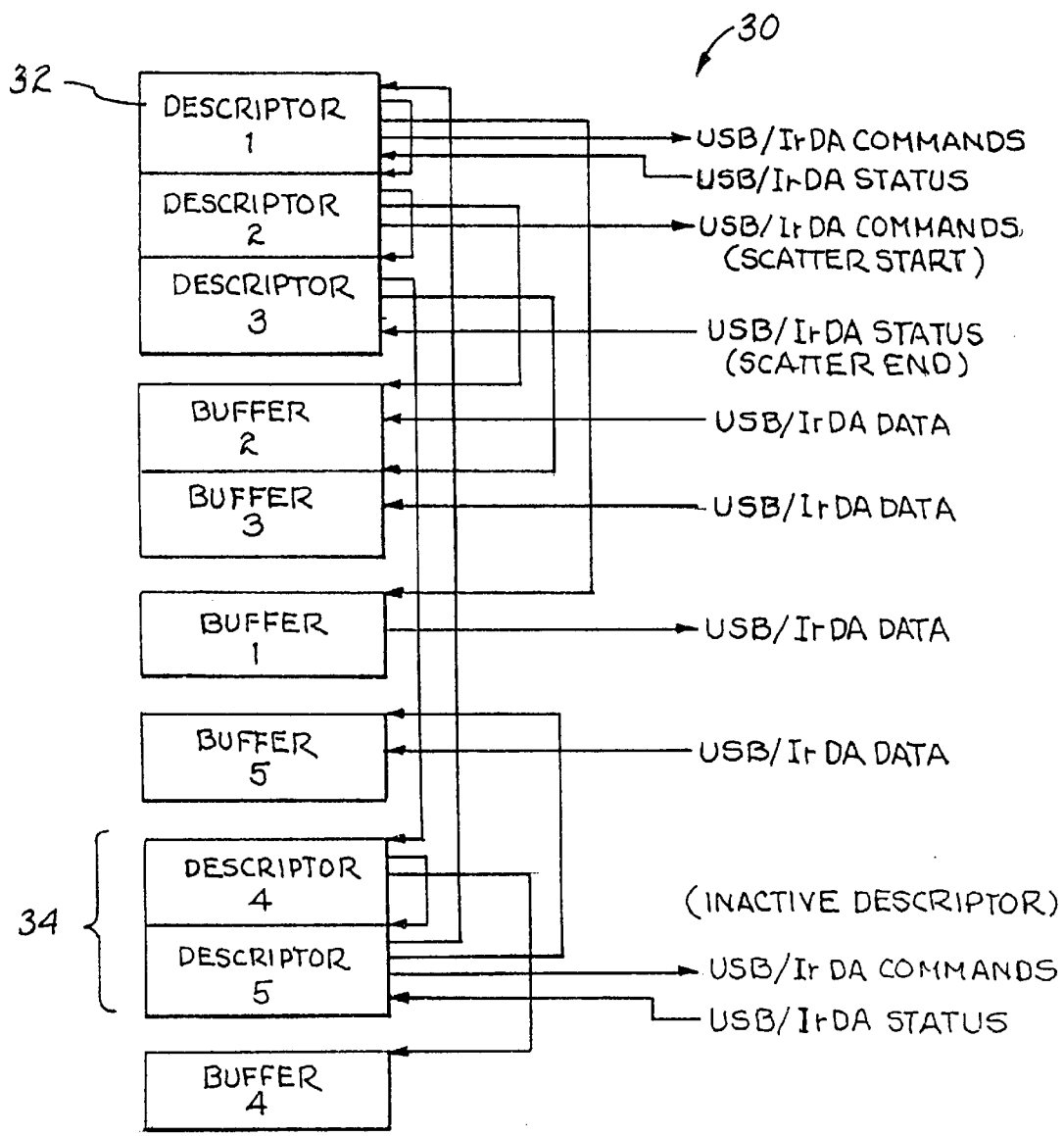
FIG. 3 is a simplified block diagram of a data buffer descriptor list used by the system depicted in FIGS. 1 and 2.

The hardware state machine 16 is coupled to the bus controller 12, the DMA controller 14, and the USB controller 18. The hardware state machine 16 is used for programming the DMA controller 14, generating and sending command signals to the USB controller 18 via command signal lines 20, and receiving completion status via status lines 22 after the transfer of data is complete. The hardware state machine 16 uses a data buffer descriptor list 30 (FIG. 3) which is stored in the memory of the system 10 for minimizing the hardware requirements of the system 10, for implementing peripheral device bus mastering, and for providing a flexible interface for a user of the system 10. The data buffer descriptor list 30 describes each data transfer that the hardware state machine 16 initiates, controls, and completes. The hardware state machine 16 has an internal register for pointing to the current address of the individual descriptor 32 (FIG. 3) that is to be used by the hardware state machine 16. It should be noted that the use of the hardware state machine 16 has one significant advantage. In desktop PC systems, the incremental hardware to implement the hardware state machine 16 is much smaller, and therefore less costly than if a device such as an embedded microcontroller was used for the same purposes as the hardware state machine 16. It should further be noted that a host Central Processing Unit (CPU) of the desktop PC system could also be used to provide the functionality of the hardware state machine 16.

The USB controller 18 is coupled to both the DMA controller 14 and to the hardware state machine 16. The USB controller 18 is used for receiving and responding to the command signals from the hardware state machine 16, transferring the data to and from the DMA controller 14, and generating and returning the completion status to the hardware state machine 16 after the transfer of data is complete. The USB controller 18 is further coupled to peripheral devices. The USB controller 18 interfaces with these peripheral devices over a serial bus. Each of the peripheral devices appear to the system 10 as a separate and independent data path. Each of the separate and independent data paths are represented by a separate one of the descriptors 32 within the data buffer descriptor list 30. Each of the separate descriptors 32 are configured independently to reflect the characteristics of an individual peripheral device's data path. In accordance with another embodiment of the present invention, each of the separate and independent data paths could be represented by a set of descriptors 34 (FIG. 3 with the data buffer descriptor list 30. In this case, each of the sets of descriptors 34 would be configured independently to reflect the characteristics of an individual peripheral device's data path.

Figure 2:
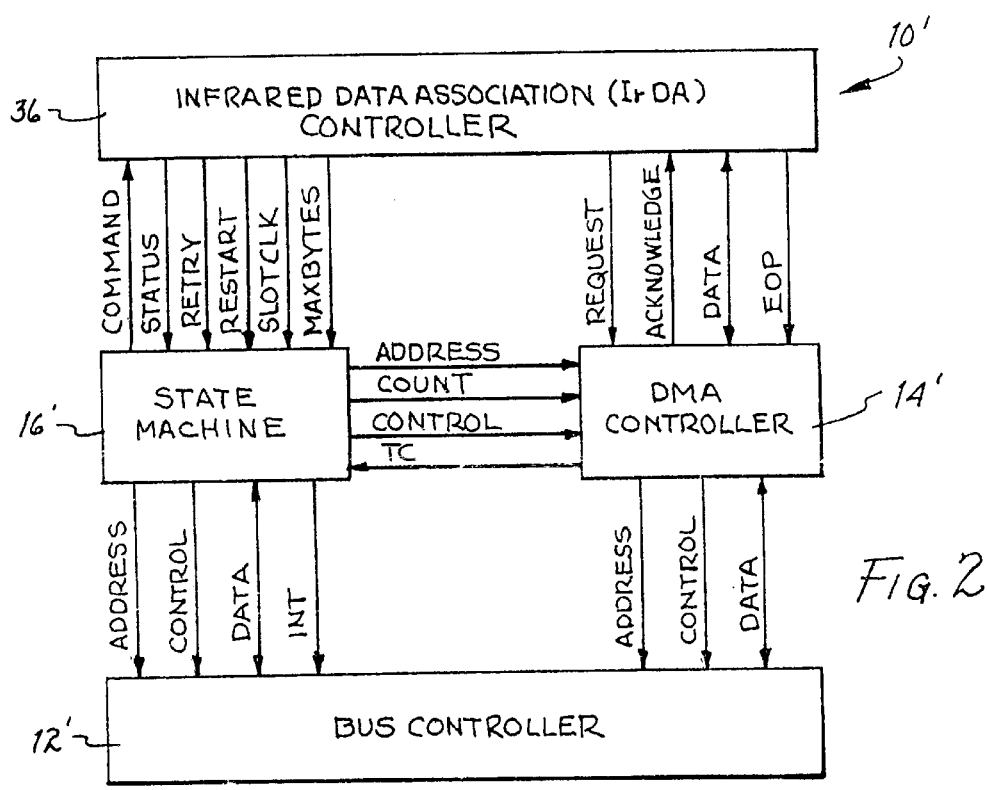
FIG. 2 is a simplified block diagram of a system for implementing peripheral device bus mastering in a desktop PC system via a IrDA controller.

Referring to FIG. 2, another embodiment of the present invention is shown and is represented by the numeral and symbol 10'. Like the system 10 shown in FIG. 1, the system 10' is comprised of a bus controller 12', a Direct Memory Access (DMA) controller 14', and a hardware state machine 16'. Each of these elements function in the same manner as described above in the previous embodiment.

The main difference between the two embodiments is that an Infrared Data Association (IrDA) controller 36 is used instead of a USB controller 18 (FIG. 1). The IrDA controller 36 is coupled to both the DMA controller 14' and to the hardware state machine 16'. The IrDA controller 36 is used for receiving and responding to the command signals from the hardware state machine 16', transferring the data to and from the DMA controller means 14', and generating and returning the completion status to the hardware state machine 16' after the transfer of data is complete. The IrDA controller 36 is also coupled to peripheral devices. However, unlike the USB controller 18, the IrDA controller 36 is managed by a packet protocol. The IrDA controller 36 is thus required to manage a number of separate data packets of varying sizes wherein each of the separate data packets are transferred to and from the IrDA controller 36.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A system for implementing peripheral device bus mastering in a desktop personal computer (PC) system comprising, in combination:

desktop PC system comprising:

Direct Memory Access (DMA) controller means for transferring data to and from memory of said desktop PC system;

hardware state machine means coupled to said DMA controller means for programming said DMA controller means, generating and sending command signals, and receiving completion status after transfer of data is complete;

descriptor means stored in said memory of said desktop PC system for describing each data transfer that said hardware state machine means initiates, controls, and completes;

register means stored within said hardware state machine for storing address information of said descriptor means;

bus controller means coupled to said DMA controller means and said hardware state machine means for implementing a memory data transfer request from said DMA controller means and said hardware state machine means; and Universal Serial Bus (USB) controller means coupled to said DMA controller means and said hardware state machine means for receiving and responding to said command signals from said hardware state machine means, transferring said data to and from said DMA controller means, and generating and returning said completion status to said hardware state machine means after said transfer of data is complete, said USB controller means further being coupled to peripheral devices wherein said USB controller means interfaces with said peripheral devices over a serial bus.

2. A system for implementing peripheral device bus mastering in accordance with claim 1 wherein functionality of said hardware state machine means is provided by a host Central Processing Unit (CPU) of said desktop PC system.

3. A system for implementing peripheral device bus mastering in accordance with claim 1 wherein said DMA controller means is implemented as a distributed DMA target slice.

4. A system for implementing peripheral device bus mastering in accordance with claim 1 wherein each of said peripheral devices appear to said system as a separate and independent data path.

5. A system for implementing peripheral device bus mastering in accordance with claim 4 wherein each said separate and independent data path is represented by a separate one of said descriptor means within a list of said descriptor means, each said separate one of said descriptor means being configured independently to reflect characteristics of an individual peripheral device's data path.

6. A system for implementing peripheral device bus mastering in accordance with claim 4 wherein each said separate and independent data path is represented by a set of said descriptor means within a list of said descriptor means, each set of said descriptor means being configured independently to reflect characteristics of an individual peripheral device's data path.

7. A system for implementing peripheral device bus mastering in a desktop personal computer (PC) system comprising, in combination:

desktop PC system comprising:

Direct Memory Access (DMA) controller means for transferring data to and from memory of said desktop PC system;

hardware state machine means coupled to said DMA controller means for programming said DMA controller means, generating and sending command signals, and receiving completion status after transfer of data is complete;

descriptor means stored in said memory of said desktop PC system for describing each data transfer that said hardware state machine means initiates, controls, and completes;

register means stored within said hardware state machine for storing address information of said descriptor means;

bus controller means coupled to said DMA controller means and said hardware state machine means for implementing a memory data transfer request from said DMA controller means and said hardware state machine means; and Infrared Data Association (IrDA) controller means coupled to said DMA controller means and said hardware state machine means for receiving and responding to said command signals from said hardware state machine means, transferring said data to and from said DMA controller means, and generating and returning said completion status to said hardware state machine means after said transfer of data is complete, said IrDA controller means further being coupled to peripheral devices wherein said IrDA controller means is managed by a packet protocol that requires the management of a number of separate data packets of varying sizes.

8. A system for implementing peripheral device bus mastering in accordance with claim 7 wherein functionality of said hardware state machine means is provided by a host Central Processing Unit (CPU) of said desktop PC system.

9. A system for implementing peripheral device bus mastering in accordance with claim 7 wherein said DMA controller means is implemented as a distributed DMA target slice.

10. A system for implementing peripheral device bus mastering in accordance with claim 7 wherein said separate data packets are transferred to and from said IrDA controller means.

11. A method for implementing peripheral device bus mastering in a desktop personal computer (PC) system comprising the steps of:

providing a desktop PC system;

providing Direct Memory Access (DMA) controller means coupled to said desktop PC system for transferring data to and from memory of said desktop PC system;

providing hardware state machine means coupled to said DMA controller means for programming said DMA controller means, generating and sending command signals, and receiving completion status after transfer of data is complete;

providing descriptor means stored in said memory of said desktop PC system for describing each data transfer that said hardware state machine means initiates, controls, and completes;

providing register means stored within said hardware state machine for storing address information of said descriptor means;

providing bus controller means coupled to said DMA controller means and said hardware state machine means for implementing a memory data transfer request from said DMA controller means and said hardware state machine means; and providing Universal Serial Bus (USB) controller means coupled to said DMA controller means and said hardware state machine means for receiving and responding to said command signals from said hardware state machine means, transferring said data to and from said DMA controller means, and generating and returning said completion status to said hardware state machine means after said transfer of data is complete, said USB controller means further being coupled to peripheral devices wherein said USB controller means interfaces with said peripheral devices over a serial bus.

12. The method of claim 11 wherein said step of providing hardware state machine means further comprises the step of providing a hardware state machine means wherein functionality of said hardware state machine means is provided by a host Central Processing Unit (CPU) of said desktop PC system.

13. The method of claim 11 wherein said step of providing DMA controller means further comprises the step of implementing said DMA controller means as a distributed DMA target slice.

14. The method of claim 11 further comprising the step of providing USB controller means wherein each of said peripheral devices appear to said system as a separate and independent data path.

15. The method of claim 14 further comprising the steps of:

providing separate and independent data paths wherein each of said separate and independent data paths is represented by a separate one of said descriptor means within a list of said descriptor means; and configuring each of said separate one of said descriptor means being to independently reflect characteristics of an individual peripheral device's data path.

16. The method of claim 14 further comprising the steps of:

providing separate and independent data paths wherein each of said separate and independent data paths is represented by a set of said descriptor means within a list of said descriptor means; and configuring each of said set of descriptor means to independently reflect characteristics of an individual peripheral device's data path.

17. A method for implementing peripheral device bus mastering in a desktop personal computer (PC) system comprising the steps of:

providing a desktop PC system;

providing Direct Memory Access (DMA) controller means coupled to said desktop PC system for transferring data to and from memory of said desktop PC system;

providing hardware state machine means coupled to said DMA controller means for programming said DMA controller means, generating and sending command signals, and receiving completion status after transfer of data is complete;

providing descriptor means stored in said memory of said desktop PC system for describing each data transfer that said hardware state machine means initiates, controls, and completes;

providing register means stored within said hardware state machine for storing address information of said descriptor means;

providing bus controller means coupled to said DMA controller means and said hardware state machine means for implementing a memory data transfer request from said DMA controller means and said hardware state machine means; and providing Infrared Data Association (IrDA) controller means coupled to said DMA controller means and said hardware state machine means for receiving and responding to said command signals from said hardware state machine means, transferring said data to and from said DMA controller means, and generating and returning said completion status to said hardware state machine means after said transfer of data is complete, said IrDA controller means further being coupled to peripheral devices wherein said IrDA controller means is managed by a packet protocol that requires the management of a number of separate data packets of varying sizes.

18. The method of claim 17 wherein said step of providing hardware state machine means further comprises the step of providing a hardware state machine means wherein functionality of said hardware state machine means is provided by a host Central Processing Unit (CPU) of said desktop PC system.

19. The method of claim 17 wherein said step of providing DMA controller means further comprises the step of implementing said DMA controller as a distributed DMA target slice.

20. The method of claim 17 wherein said step of providing IrDA controller means further comprises the step of providing IrDA controller means that are able to transfer separate data packets to and from said IrDA controller means.

* * * * *